Oct. 16, 1962     S. A. MASON     3,059,212
WIRING DEVICE

Filed July 10, 1959                                 2 Sheets-Sheet 1

WITNESSES
Edwin E. Bassler
E. F. Possessky

INVENTOR
Stuart A. Mason
BY
Donald Smith
ATTORNEY

Oct. 16, 1962  S. A. MASON  3,059,212
WIRING DEVICE

Filed July 10, 1959  2 Sheets-Sheet 2

United States Patent Office 3,059,212
Patented Oct. 16, 1962

3,059,212
WIRING DEVICE
Stuart A. Mason, Huntington, Conn., assignor to The Bryant Electric Company, Bridgeport, Conn., a corporation of Connecticut
Filed July 10, 1959, Ser. No. 826,218
1 Claim. (Cl. 339—154)

The present invention relates to electrical wiring devices, and more particularly to receptacles for which an insulative cover is to be provided.

There are, of course, a great variety of wiring devices, of which any one category provides some particular function in a wiring system. In most instances, a housing is a necessary component of a wiring device for structural as well as insulating purposes. It is, however, impractical to form a unitary housing for a complete insulative enclosure of the conductive members contained in the wiring device. Customarily, then, a housing is formed in two parts which are subsequently assembled to enclose completely and, thereby to insulate, the contained conductive members.

While the previous remarks can be recognized as being generally applicable, it must nevertheless be noted that complete enclosure of conductive members in a wiring device is not an absolute requirement. Safety considerations ordinarily determine the least extent to which partial enclosure of conductive members can be tolerated. Therefore, the present invention relates to the provision of a single-part housing affording such partial enclosure and, additionally, a cover part which is adapted for use with the housing, in a novel manner, to provide complete and insulative enclosure of the conductive members.

In any event, it is desirable that any provision for a second or cover part for a housing of a wiring device be made or assembled with a minimum of construction costs for ready assembly with the housing with an added restriction that the minimization of costs should not impair the intended functionality of the cover.

It is, therefore, an object of the invention to provide a wiring device for which novel assembly means are provided.

It is another object of the invention to provide an electrical receptacle in which individual housing parts are joined without the use of separate fasteners, such as screws or rivets and the like.

It is a further object of the invention to provide a novel cover arrangement having means for automatic engagement with a second or housing part of a receptacle.

It is an additional object of the invention to provide a novel wiring device including, a housing, a cover, and a fastener that frictionally engages both the cover and the housing to provide a rapid yet rigid assembly of the cover with the housing.

These and other objects of the invention will become more apparent upon consideration of the following detailed description of an illustrative embodiment of the invention in relation to the accompanying drawings, in which.

Figure 1:
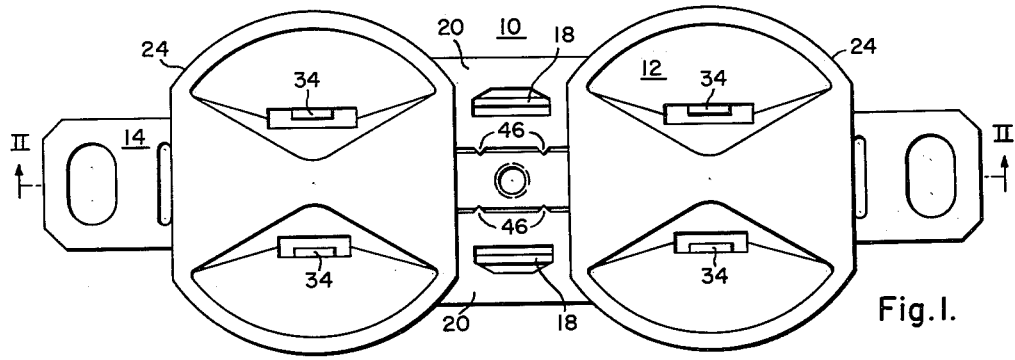
FIGURE 1 is a top plan view of an assembled electrical receptacle constructed in accordance with the principles of the invention.

With respect to the broad principles of the invention, a wiring device comprises a first housing part that receives and readily engages terminal members and a mounting means and a second housing part or cover which is readily assembled with the mentioned first housing part. Although the illustrated electrical receptacle will be described to point out the invention, other wiring devices having modified structures will obviously appear to those who are skilled in the art to which the invention belongs. Accordingly, upon this observation, the detailed description of the illustrative embodiment of the invention will now follow.

With reference to FIGS. 1, 2, 4 and 5, an electrical receptacle 10 comprises a housing member 12, a mounting member or yoke 14, a second housing member or cover 16, and terminal members 18. The housing 12 and the cover 16 are each integrally molded from a material having insulative and mechanical properties suitable for whatever employment is to be made of the receptacle 10. The structure of the housing 12 is such that it receives and insulates the terminals 18 and engages mounting member 14 whereby, upon subsequent attachment of the cover 16, the entire assemblage forms the receptacle 10 which then can be used in a manner to be noted hereinafter.

The housing 12 includes two elongated terminal receiving piers 20 having a channel 22 therebetween. The piers 20 are spanned by faced portions 24, which are provided for supporting electrical plugs (not shown) having conductive prongs for insertion in the receptacle 10. The channel 22 serves to receive the mounting member or yoke 14 in a manner which is fully described in a copending application of S. A. Mason, Serial No. 826,266, filed July 10, 1959, entitled "Wiring Device" and assigned to the present assignee.

Figure 4:
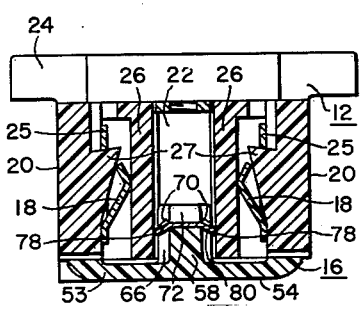
FIG. 4 is a sectional view of the receptacle shown in FIG. 1 taken along the reference line IV—IV of FIG. 2.

Each of the piers 20 is formed with structural walls 26, 28 and 30 substantially in the shape of a rectangular parallelepiped. Within the walls 26, 28 and 30, a chamber 32 is located for the reception of a terminal 18. A particular description of the principles which apply to the engagement of the terminal 18 with the pier 20 and the functional cooperation between these members is fully set forth in the previously referenced copending application of S. A. Mason. With reference to FIG. 4, it will suffice to note here that means 25 is provided for locking engagement of each terminal 18 over a projection 27 of the pier 20 whereby a contact or blade 34 on each end of the terminals 18 is positioned within the pier 20 in a manner permitting resilient engagement of the same with a prong of the mentioned plug.

Figure 2:
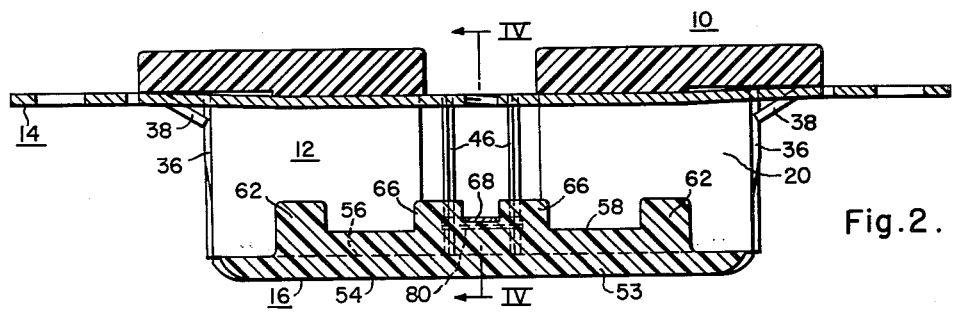
FIG. 2 is a sectional view of the receptacle shown in FIG. 1 taken along the reference line II—II of FIG. 1.

Further, each of the pier end walls 30 is provided with a projecting ridge 36 extending along its vertical dimension, as viewed in FIG. 2, for engagement with the mounting member 14 during assembly of the receptacle 10. It should be sufficient to note at this point in the description that the mounting member 14 is constructed of a conductive but resilient material, such as sheet steel, and adapted to be engaged, in the manner previously referenced, by the housing 12. The construction of the mounting member 14 includes an elongated strip 48 for positioning in the channel 22, a broadened mid-section 50 having an opening 51 for passage of a face plate fastener (not shown), and ears 52 at opposite ends for mounting the receptacle 10 when placed in use. Briefly, the physical relationships with regard to the assembly of the mounting member 14 with the housing 12 are such that cantilever tabs 38, projecting from the ears 52 at an angle of approximately 45° from the plane of the mounting member 14, upon being forced against the ridges 36 when the mounting member 14 is placed in a stable position against the underside of the faced portions 24 provide engagement of the mounting member 14 with the housing 12 so that withdrawal of the mounting member 14 is substantially prevented. As indicated hereinbefore, a more thorough description of the mounting member 14 and its relation to the housing 12 is presented in the mentioned copending application.

Figure 5:
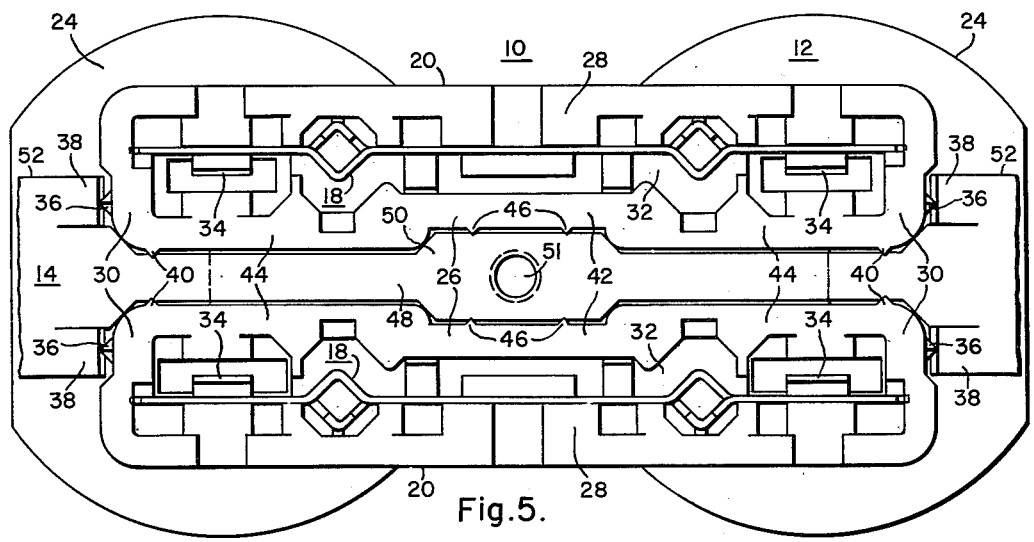
FIG. 5 is a bottom plan view of the receptacle, as shown in FIG. 3, without, however, a cover therefor.

The inner side wall 26 of each of the piers 20 is provided with perpendicularly extending ridges 40, as viewed in FIG. 5, for stabilization of the mounting member 14 when engaged in the manner just described. Additionally, a longitudinal mid-section 42 of the side wall 26 is generally recessed from the plane of the remaining longitudinal sections 44 in order to provide for reception of the mating mid-section 50 of the mounting member 14 and also a mating portion of the cover 16. The mid-section 42 also has similarly extending ridges 46 for stabilization of the mounting member 14 and additionally for contribution to the engagement of the housing 12 with the cover 16, in a manner presently to be related.

Figure 3:
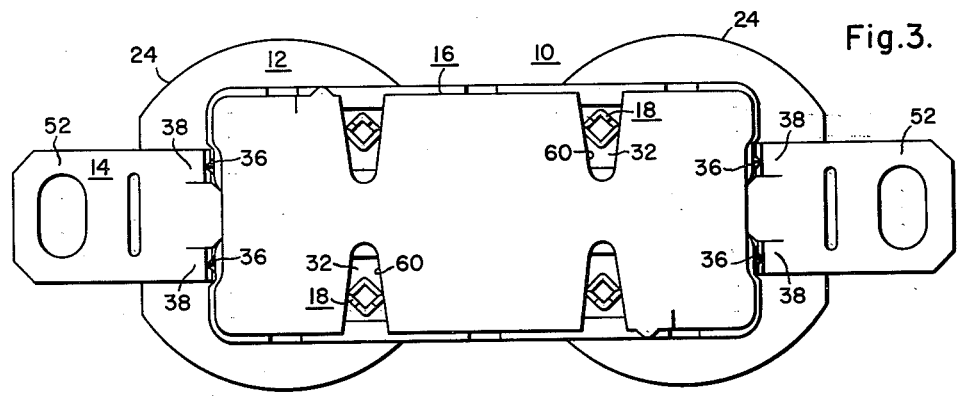
FIG. 3 is a bottom plan view of the receptacle shown in FIG. 1.
Figure 6:
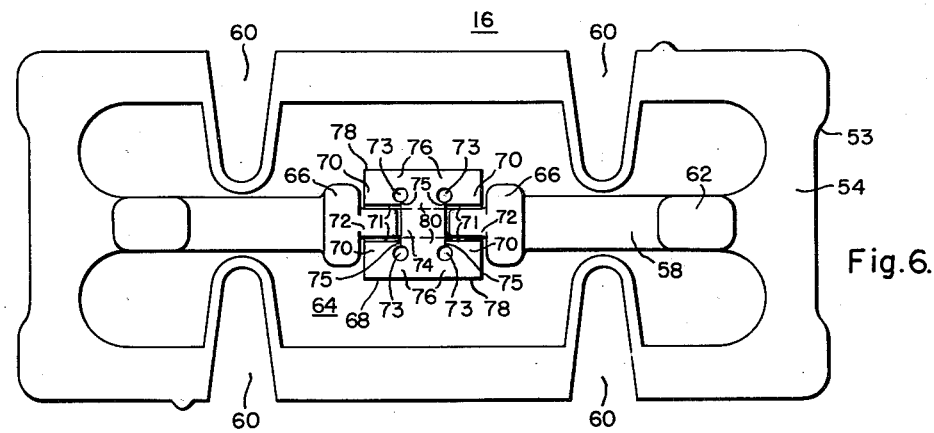
FIG. 6 is a top plan view of a cover which is shown assembled with the receptacle in FIG. 3.
Figure 7:
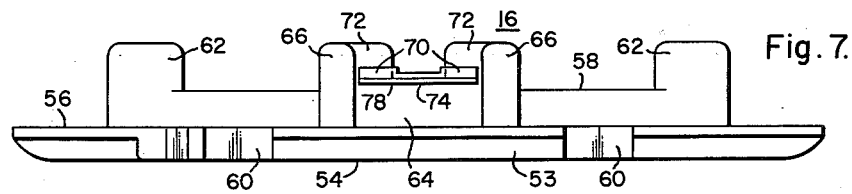
FIG. 7 is a side elevational view of the cover shown in FIG. 6.

With reference to FIGS. 3, 6 and 7, the cover 16 will now be described. While the general configuration of the cover 16 provides conformity with the housing 12, it is to be recognized that the general configuration can be accorded a multitude of shapes without departing from the principles of the invention. Withstanding this notation, the cover 16 has a slab-like appearance and is provided with a body portion 53 having a generally flat under surface 54 and a generally flat upper surface 56 with a projecting ridge 58 extending along its longitudinal center line for a considerable portion of its longitudinal dimension. Openings 60 are provided through the cover 16 for passage of wires into the receptacle 10 when the cover 16 is attached to the housing 12.

At opposite extremities of the cover ridge 58, pillars 62 are provided for guidance of the cover 16 into the channel 22 of the housing 12 and for stability in the engagement of the cover 16 with the housing 12. Further, a middle portion 64 of the ridge is provided with oppositely positioned T-shaped projections 66, as better shown in FIG. 6, for guidance into the space of the housing 12 formed in the channel 22 between the recessed mid-sections 42 of the pier inner side walls 26. A clip member 68, stamped from a material such as sheet steel, has oppositely positioned tabs 70 for straddling legs 72 of the T-shaped projections 66. Holes 73 are established adjacent the tabs 70 to facilitate deformation of the tabs 70, for reasons to be set forth hereinafter, when the clip 68 is placed in a position straddling the projection legs 72.

To this point in the description, explanation of the principles of the invention has, for the most part, been directed toward the structure of the illustrated electrical receptacle 10. It remains, therefore, to consider the cooperation of the structural elements of the receptacle 10 under the principles of the invention. Accordingly, the description will continue with the assumption that the receptacle 10 has been assembled as shown in FIG. 5, that is, that the mounting member 14 and the terminals 18 will have been engaged with the housing 12. For a full understanding of this assembly, reference is again made to the previously mentioned copending application.

The complete assembly of the receptacle 10, according to the invention herein set forth, is then made by placing the cover 16 of FIG. 6 over the housing 12 for engagement therewith. This is accomplished by first positioning the cover 16 in general alignment with the piers 20 so that the pillars 62 extend into the channel 22 and the T-shaped projections 66 extend into the space in the channel 22 bounded by the opposite recessed mid-sections 42 of the pier side walls 26. The cover 16 is then forced to a position against the housing 12, and an engagement which does not require the use of separate fasteners, such as screws and rivets or the like, and which can therefore be designated as being self-retaining, will be made.

A more thorough description of the physical principles which control the self-retaining engagement of the cover 16 with the housing 12 is now in order. Prior to assembly of the cover 16 with the housing 12, the clip 68, of course, is necessarily attached to the cover 16. This is accomplished by positioning the clip 68 so that the tabs 70 straddle the legs 72 of the T-shaped projections 66. It is necessary that the free space between the tabs 70 be less than the width of the leg 72 of the projection 66. This being the case, the clip 68 is forced toward the cover 16 whereby the opposed lateral edges 71 of the tabs 70 frictionally pass along the legs 72 until a mid-portion or clip portion 74 of the clip 68 is stationed beneath the plane of the uppermost surface of the projections 66 or even, if desired, against the ridge 58 of the cover 16. The clip 68 is thus rigidly affixed to the cover 16 for reasons now to be presented.

Because the free space between the tabs 70 is less than the width of the legs 72, the tabs 70 are deformed upon attachment of the clip 68 with the cover 16. The deformation is caused by reactionary forces of the legs 72 against passage of the tabs 70 thereover. Additionally, the deformation and the overall attachment are facilitated by the presence of the clip holes 73, which communicate with the lateral edges 71 through slits 75, respectively. This is because the reactionary forces of the legs 72 against the tabs 70 are then transmitted to a relatively small cross section of the clip 68, indicated by the reference character 76, where a high concentration of force, or a high stress, is created. Thus, a substantial part of the bending of the tabs 70 occurs about the sections 76. In the final attached position of the clip 68, the tabs 70 are deformed out of the plane of the clip 68 to extend upward and away from the plane of the cover 16 toward the legs 72 of the T-shaped projections 66. It will be further recognized that withdrawal of the clip 68 is then resisted because withdrawal forces will cause the ends of the tabs 70 to bite into the legs 72 of the projections 66.

With reference to FIGS. 2 and 4, when the cover 16 is engaged with the housing 12, as previously instructed, a self retaining relationship is occasioned. In this instance, the total width of the clip 68 is greater than the distance between the opposite side wall ridges 46 which project into the channel 22. Thus, when the cover 16 is forced against the housing 12, sides 78 of the clip 68 proceed frictionally along the vertical ridges 46 to be deformed thereby. As a consequence, an intermediate portion 80 of the clip is bent so that the plane of the portion 80 approaches the plane of the already deformed tabs 70. Withdrawal of the cover 16 is then resisted by the sides 78 of the clip 68 biting into the ridges 46 of the inner pier walls 26 in opposition to withdrawal forces. Additionally, the pillars 62 and projections 66 stabilize the cover against lateral movement relative to the housing 12.

It should be realized that the relative dimensions of the operative elements of the invention will depend upon the particular arrangement in which the invention is embodied. In any event, the invention can be employed so as to cover completely a wiring device and thereby to protect the interior of the device against the collection of foreign particles and to provide an extra insulating safety feature. Additionally, an overall smooth appearance and an economy of structure and assembly is attained.

Figure 8:
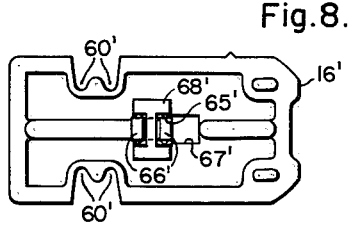
FIG. 8 is a top plan view of a modified cover in accordance with the principles of the invention.
Figure 9:
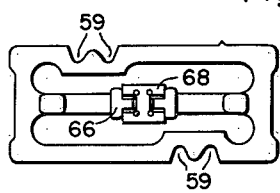
FIG. 9 is a top plan view of another modified cover in accordance with the principles of the invention.

A cover such as the one herein disclosed can additionally be used, with suitable modifications, such as openings 59 as shown in FIG. 9, with a wiring device of the type shown in a second copending application of S. A. Mason, Serial No. 826,171 filed July 10, 1959, entitled "Wiring Device," and assigned to the present assignee, and, also, with those modifications illustrated in FIGURE 8, with a wiring device of the type shown in a third copending application of R. O. Wiley, Serial No. 826,173, filed July 10, 1959, entitled "Wiring Device With Grounding Means," also assigned to the present assignee. The cover 16' of FIG. 8 is similar to the cover 16 of FIG. 6 but is different, for example, in that holes 60' are located to adapt the cover 16' for use with the device of the mentioned Wiley application and in that the clip 68' is not provided with force concentrating holes. Additionally, the projections 66' are rectangularly shaped and have protecting ridges 65', and a recess 67' is provided to allow insertion of a plug with a grounding prong into the wiring device of the Wiley application.

While the foregoing description has indicated how specific embodiments operate in accordance with the principles of the invention, there are, notwithstanding, any number of equivalent forms which are within the scope of the invention and obvious to those skilled in the art. Accordingly, it is not desired that the present invention be limited by the foregoing description, but rather that it be accorded an interpretation consistent with the scope and spirit of its broad principles.

What is claimed is:

A wiring device comprising an elongated housing of insulative material adapted to support terminals inserted through an open side thereof, an elongated cover of insulative material located against said housing open side and having an elongated portion thereof projecting into an elongated recess in said housing, and a resilient generally planar elongated clip having its plane generally parallel to said housing open side, said clip having laterally spaced longitudinally extending portions which are integrally joined by a generally longitudinally centrally located and laterally extending clip portion, said laterally extending clip portion being located in a slot, said slot extending laterally through said cover elongated portion and being open in the projecting direction of the latter, said clip longitudinal portions each having a longitudinally inwardly facing biting edge located on each side of said lateral clip portion and engaging said cover elongated portion against withdrawal of said clip from said cover, said clip longitudinal portions each also having an outwardly facing longitudinal biting edge respectively engaging a housing portion adjacent said housing recess against withdrawal of said cover from said housing.

References Cited in the file of this patent

UNITED STATES PATENTS

| | | |
|---|---|---|
| Re. 19,316 | Gaynor | Sept. 18, 1934 |
| 1,528,821 | Flagge | Mar. 10, 1925 |
| 1,631,507 | Slade | June 7, 1927 |
| 1,915,070 | Muldoon | June 20, 1933 |
| 2,031,453 | Benander | Feb. 18, 1936 |
| 2,269,198 | Hicks | Jan. 6, 1942 |
| 2,315,523 | Hubbell | Apr. 6, 1943 |
| 2,618,009 | Tinnerman | Nov. 18, 1952 |
| 2,621,947 | Markvart | Dec. 16, 1952 |

FOREIGN PATENTS

| | | |
|---|---|---|
| 468,905 | Canada | Oct. 24, 1950 |